US009338117B2

(12) United States Patent
Banatwala et al.

(10) Patent No.: US 9,338,117 B2
(45) Date of Patent: May 10, 2016

(54) ELECTRONIC NOTIFICATION SYSTEMS AND METHODS

(71) Applicant: International Business Machines Corporation, Armonk, NY (US)

(72) Inventors: Mustansir Banatwala, Hudson, NH (US); David Andrew Brooks, Arlington, MA (US); Joseph Anthony Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/027,430

(22) Filed: Sep. 16, 2013

(65) Prior Publication Data

US 2015/0081804 A1 Mar. 19, 2015

(51) Int. Cl.
*G06F 15/16* (2006.01)
*H04L 12/58* (2006.01)

(52) U.S. Cl.
CPC ............ *H04L 51/24* (2013.01); *H04L 51/043* (2013.01)

(58) Field of Classification Search
CPC ....... H04L 51/04; H04L 51/043; H04L 51/24; H04L 12/58; H04L 51/046; H04L 51/18
USPC ......................................... 709/204, 206, 238
See application file for complete search history.

(56) References Cited

U.S. PATENT DOCUMENTS

| | | | |
|---|---|---|---|
| 7,305,069 B1 * | 12/2007 | Day ................. | H04M 3/53333 379/88.13 |
| 7,698,369 B2 | 4/2010 | Addante et al. | |
| 8,321,510 B1 * | 11/2012 | Queru .............. | G06F 17/30861 709/204 |
| 8,823,507 B1 * | 9/2014 | Touloumtzis ........... | H04L 67/24 340/501 |
| 2009/0248806 A1 | 10/2009 | Teman | |
| 2009/0313554 A1 | 12/2009 | Haynes et al. | |
| 2010/0107164 A1 * | 4/2010 | Koskimies ............. | G06Q 10/10 718/100 |
| 2010/0250633 A1 * | 9/2010 | Hannuksela ............ | H04N 7/16 707/825 |
| 2010/0329434 A1 | 12/2010 | Othmer et al. | |
| 2012/0149342 A1 | 6/2012 | Cohen et al. | |
| 2012/0179767 A1 * | 7/2012 | Clarke ................... | H04L 51/34 709/206 |

* cited by examiner

*Primary Examiner* — Cheikh Ndiaye
(74) *Attorney, Agent, or Firm* — Schmeiser, Olsen & Watts LLP

(57) ABSTRACT

Described are a system and method for electronic notification. A metadata generator adds metadata including data related to a computer-related action to an electronic notification. The electronic notification configured to be received by a plurality of disparate systems. A state processing machine changes a state of the electronic notification according to the metadata. A notification modification module marks the electronic notification having the changed state, wherein the marked electronic notification is received by each of the disparate systems and is processed according to its changed state.

15 Claims, 4 Drawing Sheets

ELECTRONIC NOTIFICATION SYSTEMS AND METHODS

FIELD OF THE INVENTION

The present invention relates generally to electronic communications and, more specifically, to processing and controlling notifications in an application-agnostic environment.

BACKGROUND

Email, short message service (SMS) text messages, or the like are often used to notify a user of an action related to a service or a computer application. For instance, a computer user may receive an email message as a notification so that the user will see emails appear in his or her inbox for new items from the service or application providing an event warranting the notification. For example, a user may receive an email message indicating that the user has received a voicemail message or that a blog entry has been made that includes an answer to a question posted at the blog by the user. In another example, a user may receive a text message indicating that a package has been delivered at the user's home.

Often, a computer user may receive an electronic notification in the form of an email message or the like only after learning of the action. Referring again to the abovementioned examples, the user may receive an email message informing the user of a voicemail message, package delivery, etc. after the user has retrieved the voicemail message, received the package, and so on. An email notification delivered after the corresponding action has been performed is of little or no interest to the user. In order to clear an already processed item, a user must both visit the email application as well as each interface in the application to view the items that still appear as unread. The user must then process the unread items, for example, "open" each unread message, so that the items no longer appear as new or unread.

BRIEF SUMMARY

In one aspect, provided is an electronic notification system comprising a metadata generator that adds metadata including data related to a computer-related action to an electronic notification. The electronic notification configured to be received by a plurality of disparate systems. A state processing machine changes a state of the electronic notification according to the metadata. A notification modification module marks the electronic notification having the changed state, wherein the marked electronic notification is received by each of the disparate systems and is processed according to its changed state.

In another aspect, provided is a computer-implemented method, comprising: receiving an electronic notification in response to a computer-related action, the electronic notification configured to be received by a plurality of disparate systems; applying metadata that includes data related to the action to the electronic notification; processing the metadata; and changing a state of the electronic notification at each of the disparate systems in response to processing the metadata.

In another aspect, provided is a computer program product comprising a computer readable storage medium having computer readable program code embodied therewith. The computer readable program code comprises computer readable program code configured to receive an electronic notification in response to a computer-related action, the electronic notification configured to be received by a plurality of disparate systems; computer readable program code configured to apply metadata that includes data related to the action to the electronic notification; computer readable program code configured to process the metadata; and computer readable program code configured to change a state of the electronic notification at each of the disparate systems in response to processing the metadata.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

In brief overview, the systems and methods can change the state of a notification in response to an action. In particular, when a user processes a notification, for example, an unread email message or other application list view of items, the item can be changed from an unread state to a read state in all systems configured to receive and process the notification, for example, an electronic dashboard, an email inbox, an SMS message repository, and so on. The systems can be disparate with respect to each other.

For example, a user can create a forum topic in a discussion forum that includes a question that is sent to an email distribution list. When one user reads the question and responds with an answer to the forum topic, the other recipients of the forum topic question can receive a message that indicates the question as well as the answer. Additionally, the message is updated to include a social artifact indicating that the forum topic question has been answered. This can be in the form of an indicator, to clarify that the question posed as indeed been answered. The importance of this message is re-classified based on this information and based on user settings or rules resulting in the message being moved from a high priority view to a low priority view.

Figure 1:
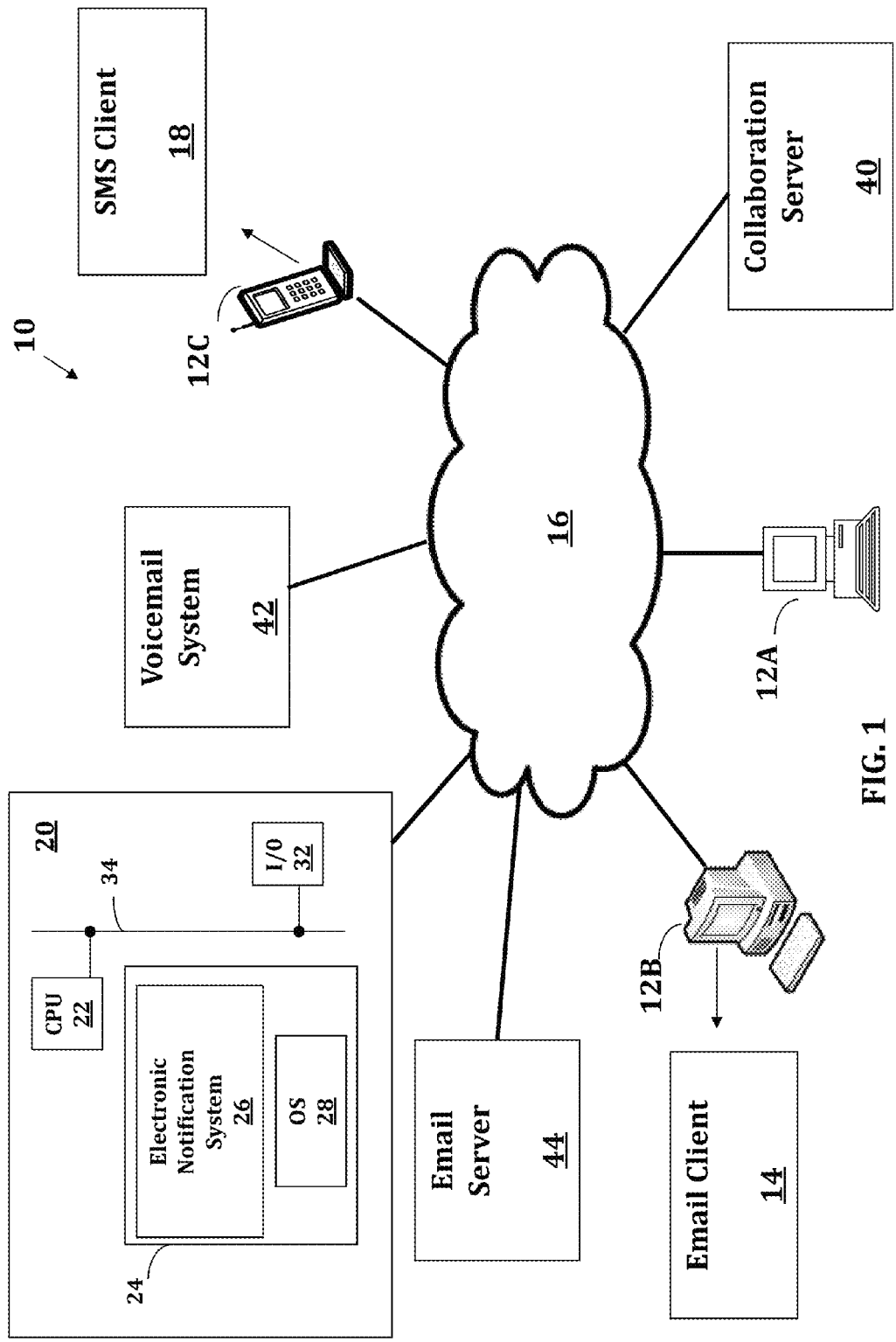
FIG. 1 is an illustration of an environment in which embodiments of the present inventive concepts can be practiced.

FIG. 1 is an illustration of an environment 10 in which embodiments of the present inventive concepts can be practiced.

The environment 10 can be an electronic communication environment where two or more users can exchange email messages, SMS messages, or other data, participate in online discussion forums or blogs, social networks, or establish other electronic communications which can include the presentation of notifications to one or more users.

The environment 10 includes user computers 12A, 12B, 12C (generally, 12) in electronic communication with each other and/or a collaboration server 40, a voicemail system 42, an email server 44, and/or an electronic notification server 20 via a network 16. The electronic notification server 20 can be a standalone platform or can be part of another platform, such as the email server 44. The collaboration server 40 can be part of an online conferencing server or related application server, or be in electronic communication with an online conferencing server or related application server via the network 16. The network 16 can include a public switched telephone network (PSTN), a mobile communications network, a data network, such as a local area network (LAN) or wide area network (WAN), or a combination thereof, or other communication networks known to those of ordinary skill in the art.

The user computers 12 can be desktop computers, laptop computers, server systems, handheld devices such as personal digital assistants (PDA) or smartphones, computer terminals, or a combination thereof, or other electronic devices having a display screen that presents content such as text, graphics, and/or video to a viewer. For example, user computers 12A and 12B can be desktop computers and user computer 12C can be a smartphone.

The user computers 12 can include one or more systems configured to process electronic notifications, for example, an email message, an SMS text message, or other electronic communication. Each system of a user computer 12 can include an application programming interface (API) for establishing a communication between the system and a source application providing an event for notification.

The electronic notification server 20 can include a processor such as a CPU 22, a memory 24, and an input/output (I/O) logic 32, for example, including a network interface card (NIC), which communicate with each other via a data/control bus and/or data connector, for example, a peripheral component interconnect (PCI) bus 34. The I/O logic 32 can include one or more adaptors for communicating with the network 16.

The memory 24 can include volatile memory, for example, random access memory (RAM) and the like, and/or non-volatile memory, for example, read-only memory (ROM), flash memory, and the like. The memory 24 can include removable and/or non-removable storage media implemented in accordance with methods and technologies known to those of ordinary skill in the art for storing data. Stored in the memory 24 can include program code, such as program code of an operating system (OS) 28 and an electronic notification system 26 executed by the processor 22.

In an embodiment, the electronic notification system 26 can modify the status of a notification in response to an action related to the notification. For example, an email notification can be sent to user computer 12B indicating that an entry is made from user computer 12A to a blog provided by the collaboration server 40, or that a voicemail message has been received for the user at the voicemail system 42. In another example, an SMS text message can be sent to smartphone 12C of the blog entry made from user computer 12A.

In conventional environments, the email notification would appear in an email inbox at user computer 12B or the SMS window at smartphone 12C having an "unread" state. However, in cases where a user at user computer 12B and/or smartphone 12C is aware of the blog entry made from user computer 12A, such notifications are obsolete and therefore not useful to the user. In an embodiment, the electronic notification system 26 can determine whether user computer 12B and/or smartphone 12C accessed the collaboration server 40 and read the blog entry made at user computer 12A. If so, the electronic notification system 26 can modify the notification so that it appears in the email inbox at user computer 12B and/or the SMS window at user computer 12C as having been read, i.e., a read state, instead of an unread state.

In other example, the electronic notification system 26 can determine whether the voicemail message for the user saved at the voicemail system 42 has been accessed, for example, from a user computer 12. If so, the electronic notification system 26 can modify the notification generated in response to the receipt of the voicemail message so that the notification appears in the email inbox at user computer 12B and/or the SMS window at user computer 12C as having been read, i.e., a read state, instead of an unread state.

Figure 2:
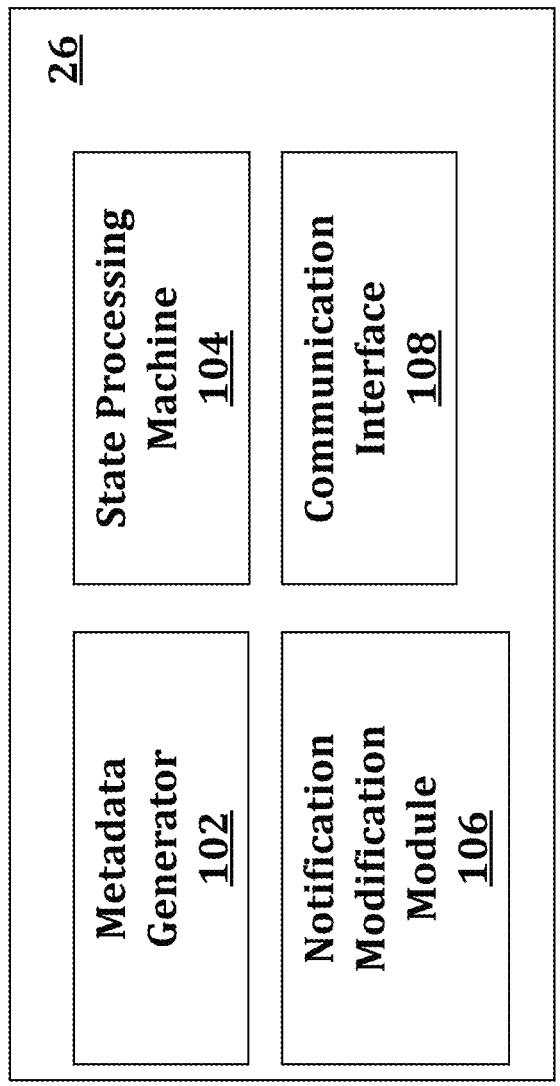
FIG. 2 is a block diagram of an electronic notification system, in accordance with an embodiment.

FIG. 2 is a block diagram of an electronic notification system 26, in accordance with an embodiment. In describing the electronic notification system 26, reference is made to elements of the environment 10 of FIG. 1. Although the electronic notification system 26 is shown as part of a standalone platform 20, in other embodiments, the electronic notification system 26 can be part of the voicemail system 42, the email server 44, one or more user computers 12, and/or other elements of the environment 10 illustrated in FIG. 1. The electronic notification system 26 leverages the capabilities of the email server 44 or other notification mechanism. Thus, any rules of the e-mail server 44 can be applied to metadata or other information generated by the electronic notification system 26.

The electronic notification system 26 can include a metadata generator 102, a state processing machine 104, a notification modification module 106 and/or a communication interface 108. Some or all of the metadata generator 102, the state processing machine 104, the notification modification module 106, and the communication interface 108 can coexist at a single computer platform, or can be separate from each other, for example, located on different computer platforms and in communication with each other via the network 16.

The metadata generator 102 can modify an electronic notification to include metadata that is added to the notification. The metadata can include rich information related to an action, for example, indicating that the notification message is a forum topic question that has already been answered, or that the notification message is a message that a package has been delivered. The metadata can include other information related to a notification object or the like such as an object identification, time of access, action taken, and/or user information. The metadata can be stored at the memory 24 or other storage device, for example, external data storage for future processing.

The state processing machine 104 can change a state of an electronic notification based on the metadata. For example, an email message status can be changed from an unread status to a read status, thereby reducing the priority of the email message with respect to a user.

The notification modification module 106 can mark all messages related to the object associated with the electronic notification so that the other messages can be marked and moved to a different state.

The communication interface 108 interfaces with an API provided by each system, for example, the email inbox, etc., which can mark an object as read so that the system changes a state of the notification, for example, from a high priority to a low priority. The communication interface 108 can include a presence detector that is made aware of a user's presence.

Figure 3:
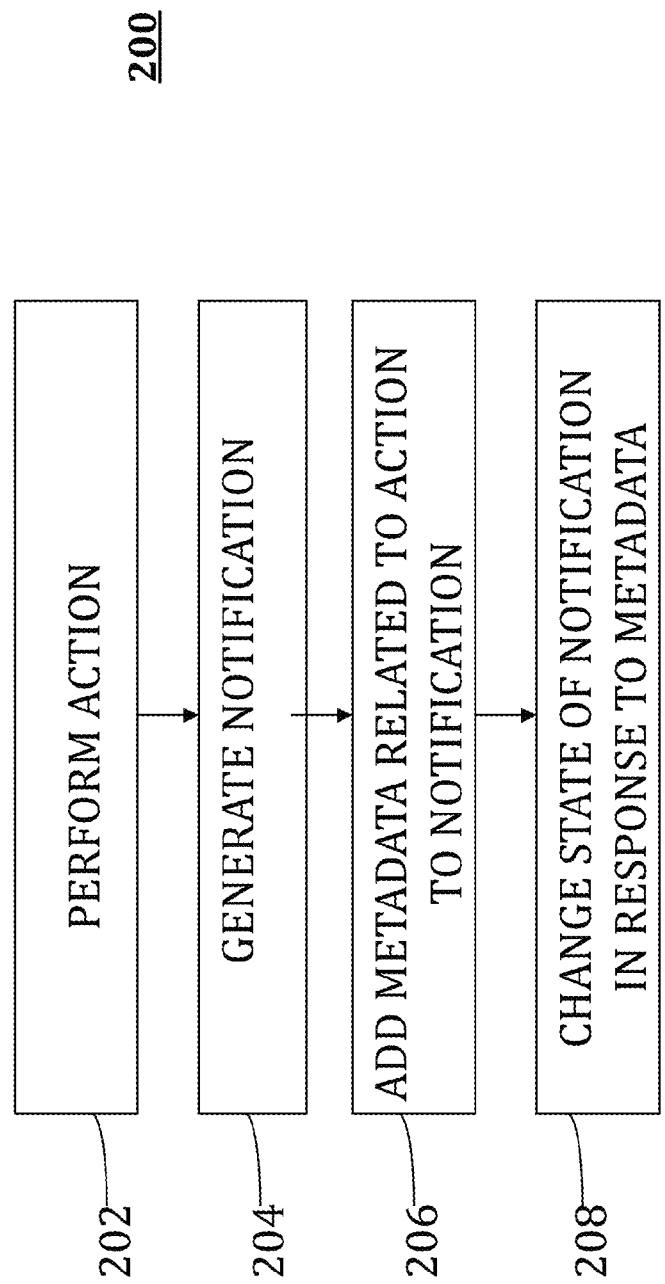
FIG. 3 is a flowchart of a method for electronic notification, in accordance with an embodiment.

FIG. 3 is a flowchart of a method 200 for electronic notification, in accordance with an embodiment. Some or all of the method 200 can be performed in elements of the environment 10 illustrated in FIG. 1. Accordingly, in describing the method 200, reference is made to FIGS. 1 and 2.

At block 202, an action is performed. Example actions can include abovementioned examples where a voicemail message is saved at a voicemail system accessible by a user, or a package tracking program is updated when a package has been delivered at a user's home.

At block 204, a notification is generated in response to the action of block 202. Referring again to the abovementioned examples, an email notification can be generated in response to the receipt at the voicemail system 42 of a voicemail message for the user, or in response to an update to the package tracking program indicating that the package has been delivered to the user's home.

At block 206, metadata related to the action is added to the notification. The metadata includes information related to a notification object or the like such as an object identification, time of access, action taken, and/or user information.

At block 208, a state of the notification can be changed in response to the metadata. For example, a notification can be "denotified" by changing the priority of the notification from a notification that is unread to a notification that is read.

Figure 4:
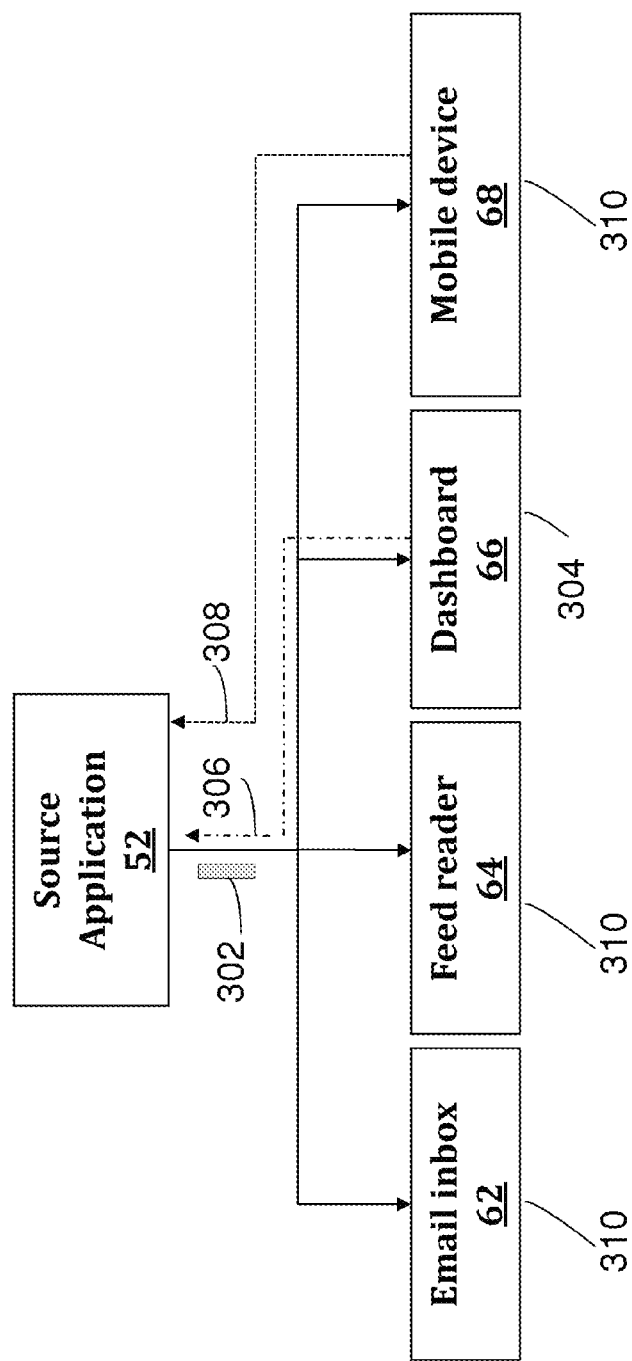
FIG. 4 is a diagram illustrating data flows between elements of a network at which one or more electronic notifications are exchanged, in accordance with an embodiment.

FIG. 4 is a diagram illustrating data flows between elements of a network at which one or more electronic notifications are exchanged, in accordance with an embodiment. In describing FIG. 4, reference is made to elements of FIGS. 1-3. Some or all of the information exchanges between a source application 52 and systems 62, 64, 66, and/or 68 can be facilitated or managed by the electronic notification system 26.

A source application 52 outputs a notification 302 to at least one of a plurality of systems 62, 64, 66, and/or 68. The source application 52 can be a computer application associated with a service. Referring again to abovementioned examples, the source application 52 can be configured to generate an email message or other electronic notification when a voicemail message is received at a voicemail server, or to generate a package delivery message when an application is updated to reflect that a package has been delivered to a user. The systems 62, 64, 66, and 68 can be installed at a user computer 12 for processing electronic notifications such as email or text SMS messages. For example, system 62 can relate to an email inbox, system 64 can relate to a feed reader, system 66 can relate to a dashboard, and system 68 can relate to a mobile device 68 application. Each system 62, 64, 66, 68 includes a user experience (UX).

The notification 302 is marked with metadata, for example, generated by the metadata generator 104. The metadata includes information related an object identifier, for example, a universally unique identifier (UUID), time of access, action taken, and/or user information. User feedback information can include data that is sent back to the system to reflect any actions, provided in metadata, that are provided by the user. For example, a user who has read an item can result in data being output to the service to indicate that the item has been "read" by the user. Since a system in accordance with some embodiments can bridge any type of technology for example illustrated herein, can allow for any required feedback data. Examples can include a property setting, text strings, and so on. A user may add a comment or set other properties that are returned to the corresponding service to properly process the object in its native system.

Other metadata information can include an address where the receiving systems 62, 64, 66, 68 can communicate, for example, for calling a "markobject" function. Referring again to abovementioned examples, the metadata can include information that the notification 302 relates to a forum topic question that has already been answered, or that a package has already been delivered. Each system 62, 64, 66, 68 can include an API that can provide the metadata information specific to the notification 302.

The user can perform an action 304 at a system UX, for example, the dashboard UX 66, to process the notification 302. The action 304 performed at the system UX can include processing the metadata such as parameters indicating the UUID of the object. After the notification 302 is read at the dashboard system UX, the system 66 can process the address at the source application 52 for indicating that the notification 302 has been read at the dashboard system UX. This feature can provide a way by which a main service can communicate with other services to set data on the object to reflect the new state, for example, calling a "markobject" function at the source application 52. For example, where an email message is marked as read, the user can read the item in email message and the core service can be called to inform the service that the item has been read. The service in turn can communicate with one or more other services, such as a dashboard, voice processor, etc., each being called with the function to "mark" the object to its new state so that it reflects the new marked state.

At least one system, for example, the dashboard UX 66, can make a call 306 to the source application 52 to determine whether this mark has been processed. For example, the dashboard UX 66 can mark an object indicating that the read action has been performed. When an object is marked in this manner, the system can invoke a method that alters the status.

Another system UX, for example, a mobile device system UX 68, can make a call 308 to check if the mark has been processed. A check function provided by the API can process a list of UUIDs, the address of the source application 52, etc. In an embodiment, the electronic notification system 26 can detect a user's presence, for example, detecting a page reload, after which the check can occur. Thus, a function can be constructed and arranged as a push model, where in the notification processing service calls out to each application to force the application to update its relevant objects, or constructed and arranged as a pull model, where a notification service or the like holds the marked state of the object. Here, when a user accesses an application such as a web-based dashboard, the web page will reload to show the user the latest state. The reload action can trigger a call to the notification service to determine the state and properly update the rendering of the object for the user so that it reflects the new marked state.

At step 310, the notifications displayed at the other systems 62, 64, 68, can be moved to a different UX view, for example, a lower priority view, based on the updated mark with respect to the dashboard 66. Each system 62, 64, 66 can include a set of rules and configuration settings that establishes how messages are organized according to priority according to the processed mark.

For example, when an item has been marked to a new state, for example, a read state, systems will often reorganize displayed items to promote new/unread items to a higher importance and to demote others. For example, in an email inbox, unread objects are often marked to distinguish the unread objects, e.g., display in a bold font, while read objects are marked with regular font. Other ways to indicate a level of importance can be leveraged. For example, in a grouping, items that are processed can be grouped in a less prominent place than a main view, so it only shows things the user hasn't processed. The less prominent place can be revealed, as in a "more . . . " link or "see all" action button.

Thus, when the dashboard 66 processes an unread notification, the notifications at the other systems 62, 64, 68, can be changed to a read state. The user can go to one or more of the system UXs where the item is identified as having a previous state of being an unread item, now marked as read, and visually observe from the feedback information whether the user should engage. In addition, the various UXs that display this message can be configured to show the message in a high priority or move it to a lower priority view based on the feedback information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. An electronic notification system, comprising:
a metadata generator, being a module combining hardware and software components including circuitry, that adds metadata including data related to a first computer-related action to an electronic notification, the electronic notification configured to be received by a plurality of disparate systems;

a notification server that generates the electronic notification from a source application associated with a service, and sends the electronic notification to each of the plurality of disparate systems in response to receiving a communication from an electronic device generating a second computer-related action;

a state processing machine, being a module combining hardware and software components including circuitry, that processes the metadata in response to the second computer-related action at one of the plurality of disparate systems, and changes a state of the electronic notification to each of the plurality of disparate systems according to the metadata, wherein the one of the disparate systems outputs a call to the source application indicating that the one of the disparate systems processed the metadata; and a notification modification module, of combined hardware and software components including circuitry, that marks, that the one of the disparate systems processed the metadata and the electronic notification is at a changed state, wherein the marked electronic notification is received by each of the disparate systems and is processed according to the changed state;

wherein the source application checks, by another one of the disparate systems, to determine whether the another one of the disparate systems has received the electronic notification at the changed state, and wherein the plurality of disparate systems executing on user computers including systems such as desktop computers, laptop computers, server systems, handheld devices, personal digital assistants (PDA), smartphones, computer terminals, or a combination thereof, or an other electronic device having a display screen that presents content such as text, graphics, or video.

2. The electronic notification system of claim 1, further comprising a communication interface that communicates with an application programming interface (API) of each system of the disparate systems.

3. The electronic notification system of claim 2, wherein the communication interface includes a presence detector that is made aware of a user's presence.

4. The electronic notification system of claim 1, wherein the systems include at least one of an email inbox, a short message service (SMS) repository, a feed reader, an electronic dashboard, and a mobile device application.

5. The electronic notification system of claim 1, wherein the metadata includes information related to a notification object.

6. The electronic notification system of claim 5, wherein the information related to the notification object includes at least one of an object identification, time of access, action taken, user information, an object identifier and an address where the plurality of disparate systems can communicate.

7. A computer-implemented method, comprising:
applying metadata to an electronic notification in response to a first computer action related to the electronic notification the electronic notification being configured to be received by a plurality of disparate systems, and being generated on a notification server from a source application associated with a service;

sending the electronic notification to each of the plurality of disparate systems via the network;

receiving the electronic notification at each of the plurality of disparate systems;

processing the metadata in response to a second computer-related action at one of the plurality of disparate systems;

changing a state of the electronic notification in response to the processed metadata and sending the changed state electronic notification to each of the plurality of disparate systems;

receiving, at the source application, a communication from an electronic device generating the second computer-related action;

outputting the electronic notification from the source application to one of the disparate systems in response to receiving the communication from the electronic device generating the second computer-related action;

outputting a call from the one of the disparate systems to the source application indicating that the one of the disparate systems processed the metadata;

marking at the source application that the one of the disparate systems processed the metadata and the electronic notification is at a changed state; and checking, by another one of the disparate systems, with the source application to determine whether the another one of the disparate systems has received the electronic notification at the changed state, wherein the plurality of disparate systems executing on user computers including systems such as desktop computers, laptop computers, server systems, handheld devices, personal digital assistants (PDA), smartphones, computer terminals, or a combination thereof, or an other electronic device having a display screen that presents content such as text, graphics, or video.

8. The method of claim 7, further comprising: changing a state of a display of the electronic notification at each of the plurality of user computers to a new display state in response to a determination of the marking at the source application.

9. The method of claim 8, wherein each of the plurality of user computers includes a set of rules and configuration settings different than a set of rules and configuration settings of the other user computers, and wherein the changed state of the electronic notification at the other user computers is established by the set of rules and configuration settings of the other user computers.

10. The method of claim 8, wherein the electronic notification displayed at the other user computers is moved to a different view in response to the marking at the source application.

11. The method of claim 7, further comprising providing a communication interface at the source application that communicates with an application programming interface (API) of each system of the user computers.

12. The method of claim 7, wherein the plurality of user computers include at least one of an email inbox, a short message service (SMS) repository, a feed reader, an electronic dashboard, and a mobile device application.

13. The method of claim 7, wherein the network comprises a combination of a public switched telephone network (PTSN), a mobile communications network, a data network, a local area network (LAN), and a wide area network (WAN).

14. The method of claim 7, wherein the metadata includes information related to the notification object that includes at least one of an object identification, time of access, action taken, user information, an object identifier and an address where the user computers can communicate.

15. A computer program product, comprising:
a computer readable non-transitory storage medium having computer readable program code embodied therewith, the computer readable program code comprising:

computer readable program code configured to receive an electronic notification in response to a first computer-related action, the electronic notification configured to be sent to a plurality of disparate systems, and being generated on a notification server from a source application associated with a service;

computer readable program code configured to apply metadata to the electronic notification in response to a first computer action related to the electronic notification being configured to be received by a plurality of disparate systems;

computer readable program code configured to process the metadata in response to a second computer-related action at one of the plurality of disparate systems; and computer readable program code configured to change a state of the electronic notification, in response to the processed metadata, at each of the disparate systems in response to processing the metadata, wherein a second computer-related action is generated in response to a communication from an electronic device, the electronic notification is output from the source application to one of the disparate systems in response to receiving the communication, a call is output from the one of the disparate systems to the source application indicating that the one of the disparate systems processed the metadata, the source application is marked when the one of the disparate systems processes the metadata and when the electronic notification is at a changed state, wherein another one of the disparate systems checks with the source application to determine whether the another disparate system has received the electronic notification at the changed state, and wherein the plurality of disparate systems executing on user computers including systems such as desktop computers, laptop computers, server systems, handheld devices, personal digital assistants (PDA), smartphones, computer terminals, or a combination thereof, or an other electronic device having a display screen that presents content such as text, graphics, or video.

* * * * *